(No Model.)  6 Sheets—Sheet 5.
T. E. KING.
MITER SAW.
No. 506,433.  Patented Oct. 10, 1893.
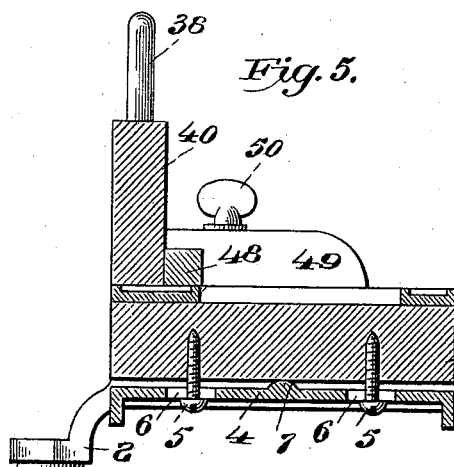
Fig. 5.
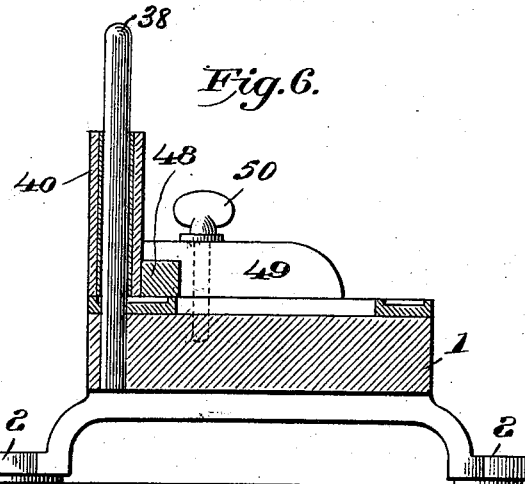
Fig. 6.
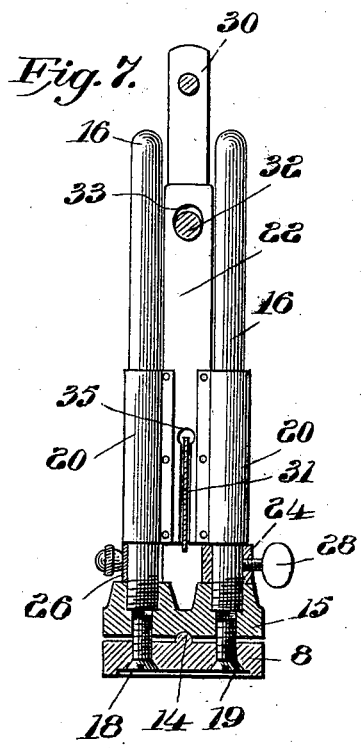
Fig. 7.
Fig. 8.
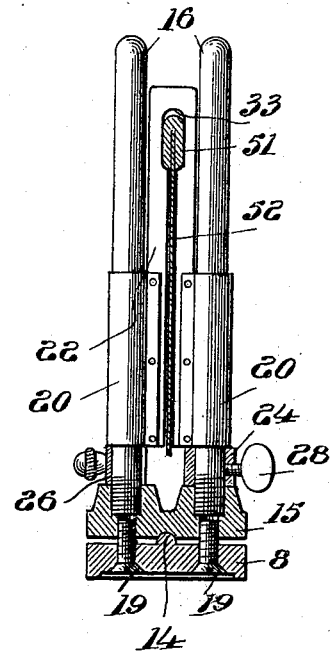
Fig. 9.
WITNESSES:
J. F. Finch.
N. J. Tanner
INVENTOR
T. E. King
BY
J. T. Smith Jr.
ATTORNEY

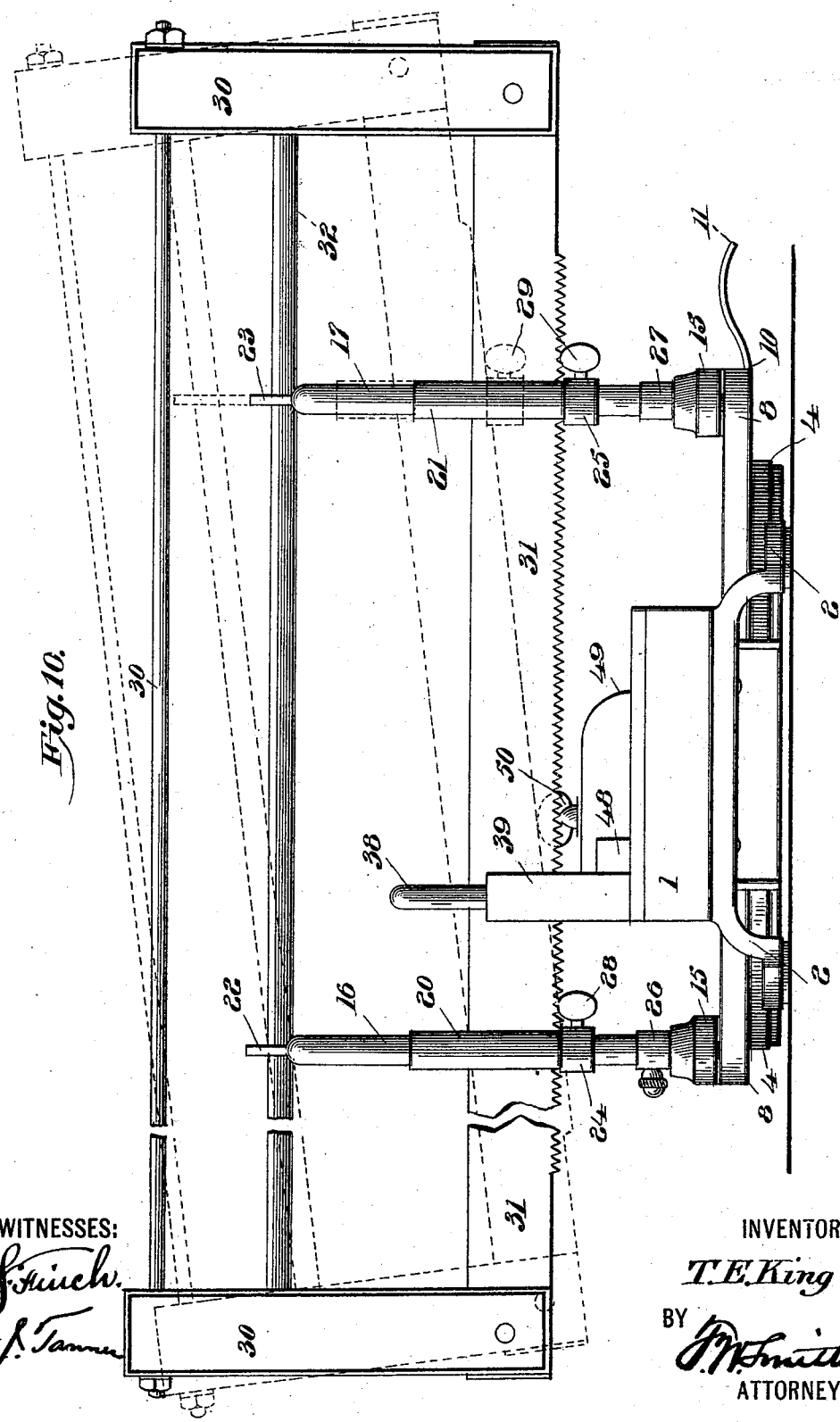

UNITED STATES PATENT OFFICE.

THEODORE E. KING, OF WESTPORT, CONNECTICUT.

MITER-SAW.

SPECIFICATION forming part of Letters Patent No. 506,433, dated October 10, 1893.

Application filed April 1, 1893. Serial No. 468,702. (No model.)

*To all whom it may concern:*

Be it known that I, THEODORE E. KING, a citizen of the United States, residing at Westport, in the county of Fairfield and State of Connecticut, have invented certain new and useful Improvements in Miter-Saws; and I do hereby declare the following to be a full, clear, and exact description of the invention, such as will enable others skilled in the art to which it appertains to make and use the same.

My invention relates to miter saws, and has for its objects the ready adjustment of the bed to a horizontal plane, the adaptation of the back boards to different heights of moldings or other pieces to be sawed, the guiding of the saw in a true vertical plane, and the adjustment of such saw to an operative field in a given horizontal plane.

With these ends in view my invention consists in certain details of construction and combination of elements such as will be hereinafter fully described and then specifically be designated by the claims.

Figure 1:
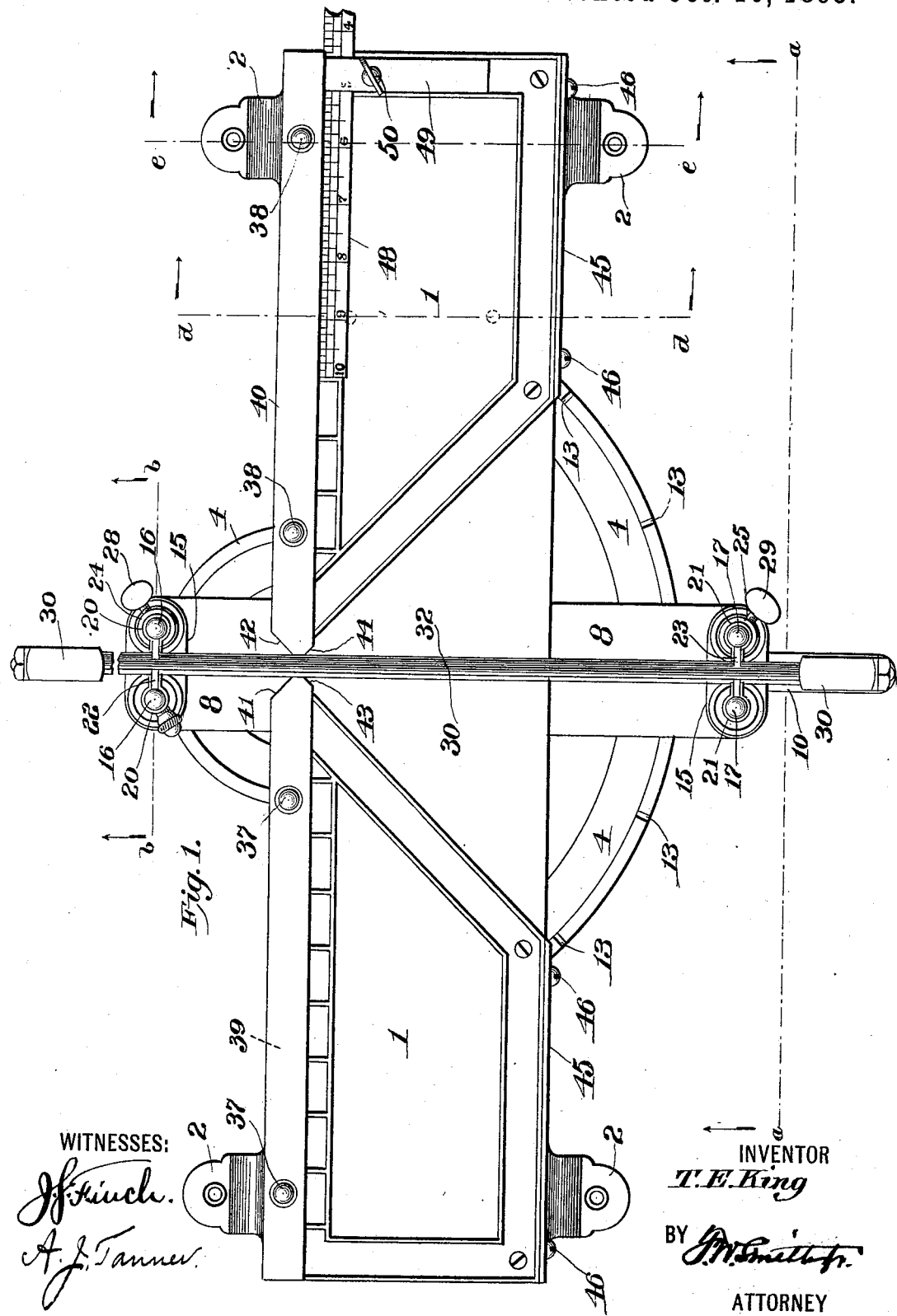
Figure 2:
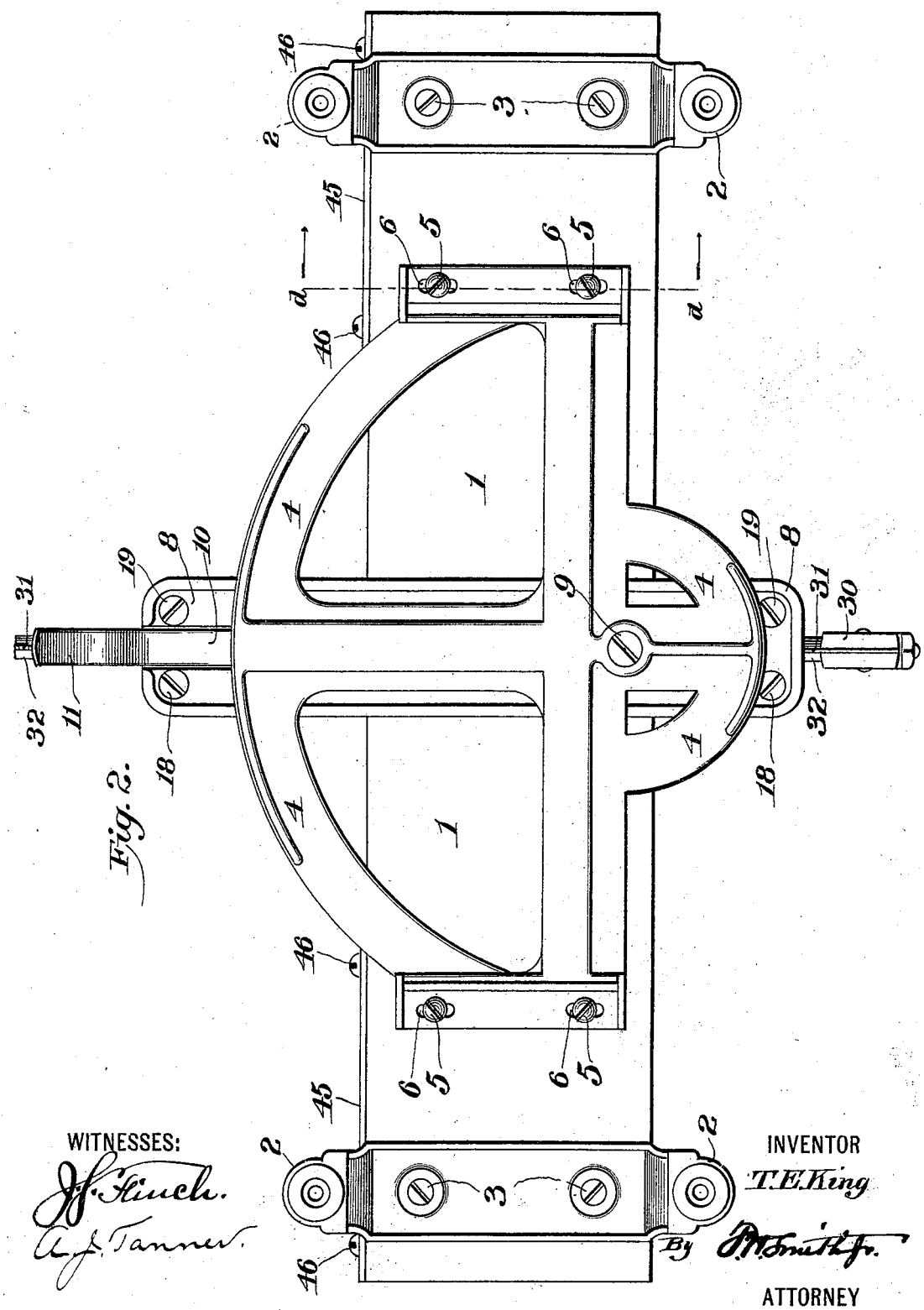
Figure 3:
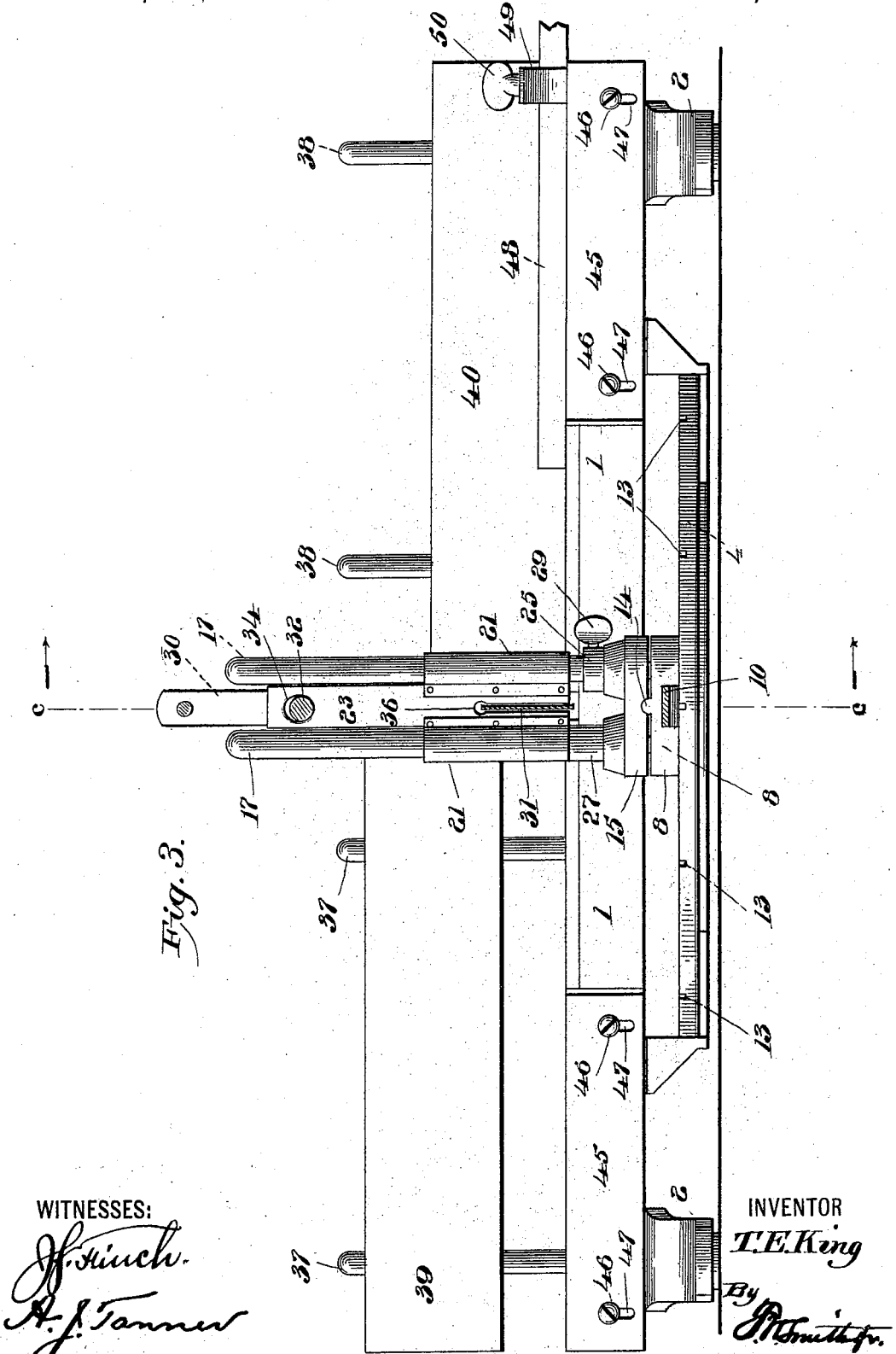
Figure 4:
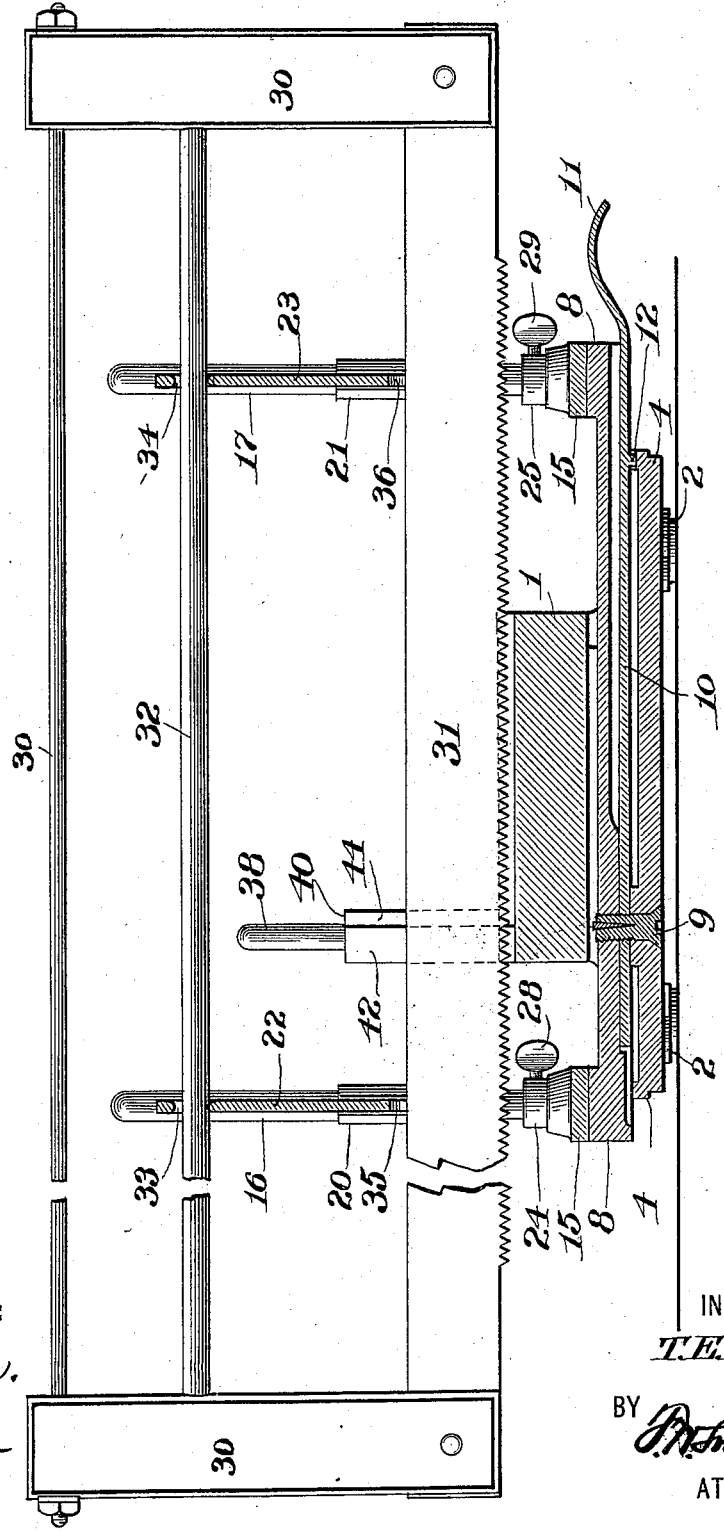

In the accompanying drawings—Figure 1, is a plan view of my improvement; Fig. 2, a bottom view thereof; Fig. 3, a section at line *a, a,* of Fig. 1; Fig. 4, a section at line *c, c,* of Fig. 3; Fig. 5, a section at line *d, d,* of Figs. 1 and 2; Fig. 6, a section at line *e, e,* of Fig. 1, and Fig. 7, a section at line *b, b,* of Fig. 1; Fig. 8, a detail perspective of the friction collar which sustains the saw in elevated position; Fig. 9, a view similar to Fig. 7, but showing an ordinary back saw hung in the saw supporting yoke; Fig. 10, an end elevation of my improvement, showing in solid lines the adjustment of the saw in an elevated horizontal plane, and showing in dotted lines the adjustment of said saw in an inclined plane.

Similar numbers of reference denote like parts in the several figures of the drawings.

1 is a bed supported on legs 2 secured to said bed by screws 3. 4 is an adjusting frame secured to the bottom of said bed by adjusting screws 5 which are passed through elongated slots 6 in the ends of the frame. This frame has contact with the bed only at the sides of said frame, and such contact is afforded by means of nubs or projections 7 (only one shown) rising from the ends of the frame at the middle portion thereof. On this frame rest the saw supporting devices hereinafter to be explained, and, owing to the rocking contact of such frame with the bed 1, said frame may be readily trued to a given plane by the manipulation of the screws 5, as will be hereinafter more fully set forth.

8 is the swing bar pivoted at 9 on top of the frame so as to be capable of a free radial movement, and 10 is a resilient latch bar carried by the bar 8 and provided at its outer end with a finger lift 11. This latch bar has a teat 12 depending therefrom adapted to engage with notches 13 in the frame, when the bar 8 is swung around its pivotal point, whereby said bar may be held in various angular adjustments. This bar 8 swings clear of the bed 1 beneath the same and extends a short distance rearward of the pivotal point 9. At the ends of the bar 8 on the upper surface thereof are ribs 14, one at each end midway of the width of the bar, on which rest blocks 15 within which latter are secured vertical twin guide rods 16, 17.

18, 19, are adjusting screws driven through the respective ends of the bar 8 from the bottom thereof within the blocks 15, whereby such blocks may be readily trued to a given plane in order to insure a perfect vertical adjustment of the rods 16, 17, the rocking of said blocks on the ribs 14 rendering this adjustment very simple.

The frame 4 extends in the front and in the rear of the bed 1 and on opposite sides of the pivotal point 9, in order to afford a support for the bar 8 on each side of such point, thus steadying such bar and the parts carried thereby.

Around the rods 16, 17, and capable of sliding freely thereon, are guide yokes 20, 21, each yoke having a web like part 22, 23, in the center and extending upward between the rods. These yokes are supported by collars 24, 25, 26, and 27, around the guide rods and are capable of sliding thereon. The collars 24, 25, are provided with set screws 28, 29, whereby such collars may be secured to the rods in various vertical adjustments. The collar 26 is split, as shown in Fig. 8, and clasps its rod firmly, so that when such collar is moved upward along the rod it (the collar)

will remain in any position owing to its frictional grip around the rod.

30 is the frame of the saw and 31 the blade. A rod 32 extending throughout the length of the saw frame between the opposite ends of the latter passes through openings 33, 34, in the top of the webs 22, 23, whereby the saw frame is hung to the guide yokes.

The blade of the saw passes freely through slits 35, 36, in the bottom of the webs, so that it will be readily understood that the saw is hung within guide yokes so as to be supported thereby and at the time be capable of the requisite to and fro movements. At the rear of the bed 1 rise two sets of vertical guide pins 37, 38, on opposite sides of the saw frame, and the back boards 39, 40, are supported and guided around such pins with sufficient friction therearound, so that they will remain in any position to which they are elevated as will be readily understood by reference to Fig. 3, the object of which will be presently explained. These back boards at their inner edges are separated by a space sufficient to admit the saw blade, which space is immediately above the pivotal point 9, said edges being beveled away as seen at 41, 42, 43, 44, to permit the swing of the saw blade in its various angular adjustments.

The operation of my improvement is as follows: The saw is raised so that the strip to be cut may be properly placed in position in the usual manner, and in this connection I would state that the friction collar 26 may be raised to afford a support for the yoke 20 in order that the saw may be held in elevated position so that the workman may have the use of both hands in fixing the strip in position. This friction collar is readily depressed when the saw is manipulated to cut the strip. The proper angular adjustment of the saw is effected as hereinbefore set forth, whereby the desired miter cut is made. Owing to the fact that the guide yokes are capable of sliding independently on their respective guide rods, and since the openings 33, 34, and the slits 35, 36, are large enough to permit of vertical play of the rod 32 and saw blade respectively, the workman is not confined to the driving of the saw in horizontal planes, but, on the other hand, he may use the saw in the usual manner rocking it up and down at various angles precisely as if he were manipulating an ordinary hand or rip saw. This is a decided advantage in that it greatly relieves the workman and permits him to use the saw in cutting various kinds of strips, moldings, &c., in the manner dictated by his best judgment.

It frequently happens that a mortise must be cut down to a given point in a strip of wood or piece of timber, and my improvement is especially adapted for this work in that the saw may be elevated to a predetermined plane and the clamp collars 24, 25, elevated and secured accordingly so as to afford a fixed support for the guide yokes, thus precluding the accidental cutting of the mortise below such point, as will be readily understood by reference to Fig. 9. Should it be necessary to cut the floor of the mortise on an incline, the clamp collars are simply secured to the guide rods at such points as will afford the support for the saw frame at the desired incline, as clearly shown by dotted lines in Fig. 10.

The back boards, in devices of this description, are usually of a medium height, but when a strip or molding to be cut is considerably higher than the back board it becomes very difficult, if possible at all, to hold the strip or molding by the hand during the cutting, and on the other hand, if the back boards are made higher the same difficulty presents itself when very small strips or moldings are to be cut. My invention provides for strips or molding of different heights, for the height of the back boards themselves is such that the small strips are readily handled, while, in the instance of the larger strips, such boards are simply raised until their elevation is such that said strips are handled equally as well as the smaller strips. Especially in the instance of heavy "crown moldings" does the adjustability of these back boards prove a great advantage, and in order to still further aid the workman in keeping such moldings in position, I provide stop plates 45 which are secured to the front edge of the bed 1 by means of screws 46 which latter are driven through elongated slots 47 in said plates into the bed, whereby said plates may be raised so as to project above the plane of the bed and thus afford an abutment to prevent the molding from slipping outward. Should the molding not fit snugly between the back boards and the stop plates (and this is usually the case) the workman simply fills in the space between such molding and plates with blocks or strips of wood. In the handling of these heavy moldings, the office of the friction collar 26 becomes very important, since the saw may be held out of the way of the molding and the workman may have the use of both hands in placing and securing such molding in position. For cutting off predetermined lengths of strips, I provide a gage bar 48 graduated as shown in Fig. 1, said bar adapted to slide on the bed 1 at one end thereof, and secure said bar by means of a clamp bar 49 which overlaps the gage bar, as shown in Figs. 5 and 6, said clamp bar being secured by means of a thumb screw 50 driven through the bar into the bed.

The graduation, on the gage bar may register with any fixed point, as for instance the inner edge of the clamp bar. In cutting a certain length off the end of the strip, the gage 48 is moved outward until the graduation which corresponds to such length registers with the inner edge of the clamp bar.

The adjustment of this gage bar shown in Fig. 1 indicates that five inches are to be cut from the end of the strip.

I have shown and described a saw and frame made after the manner of an ordinary buck saw, but my invention is not limited to the use of any particular kind of saw.

The saw which I have shown is admirably adapted for use in connection with my invention, but, an ordinary back saw may be used instead of the saw which I have shown, in which instance the rib 51 on the back of such saw would be supported within the openings 33, 34, while the blade 52 of such saw would extend through the slits 35, 36, which latter would be elongated to accommodate the greater depth of blade, as clearly shown in Fig. 9.

I do not wish to be limited to the exact details of construction shown and described with respect to the part which supports the saw and which is guided vertically on the rods 16, 17, since such part may be confined and guided as to its vertical movements by means of any suitable connection with said rods, without departing from the spirit of my invention, the gist of which rests in the broad idea of hanging the saw within two supports one at each end which are capable of a true vertical adjustment.

Having now described my invention, what I claim as new, and desire to secure by Letters Patent, is—

1. In a mitering machine, the bed, the adjusting frame secured to the bottom of said bed and having set screws at the ends engaging said bed, and a projection intermediate said screws whereon the bed rests, whereby the frame and bed may be trued or adjusted relatively to each other, in combination with the saw supports connected to said bed, substantially as described.

2. In a machine of the character described, the bed, the adjusting frame secured to the bottom of said bed by adjusting screws passing through slots in the frame and entering the bed, and the saw supports connected to said bed and frame by an intermediate, all combined substantially as described.

3. In a machine of the character described, the frame adjustably connected to the bottom of the bed, the swing bar pivoted to said frame and beneath the bed, and the guide rods connected to said swing bar and affording a support for the saw, all combined substantially as described.

4. The bed and its vertical guide pins arranged in pairs, one pair at each side of the saw guides or supports, and the back boards, one at each side of the saw guides, each back board having perforations through which said guide pins pass, whereby the back boards can be separately adjusted and to different heights, in combination substantially as described.

5. The bed and its back boards separately adjustable in vertical direction, the frame adjustably connected to said bed, the swing bar pivoted to said frame, and the saw guides connected to said swing bar, all combined substantially as described.

In testimony whereof I affix my signature in presence of two witnesses.

THEODORE E. KING.

Witnesses:
F. W. SMITH, Jr.,
A. J. TANNER.